United States Patent [19]

Evans et al.

[11] 4,011,367
[45] Mar. 8, 1977

[54] SODIUM-SULPHUR ELECTRIC CELLS

[75] Inventors: Leslie Samuel Evans, Reading; Trevor Leslie Markin, Goring-on-Thames; Roger John Bones, Abingdon, all of England

[73] Assignee: The Secretary of State for Defence in Her Britannic Majesty's Government of the United Kingdom of Great Britain and Northern Ireland, England

[22] Filed: June 17, 1976

[21] Appl. No.: 696,895

[30] Foreign Application Priority Data

June 23, 1975 United Kingdom ............ 26628/75

[52] U.S. Cl. .............................. 429/104; 429/163
[51] Int. Cl.² ...................................... H01M 10/00
[58] Field of Search ............ 429/104, 57, 66, 164, 429/34, 31

[56] References Cited

UNITED STATES PATENTS

| 3,811,955 | 5/1974 | Ralston et al. ...................... 429/57 |
| 3,982,957 | 9/1976 | Wynn et al. .................... 429/185 X |
| 3,982,959 | 9/1976 | Partridge et al. ................ 429/34 X |

Primary Examiner—Anthony Skapars
Attorney, Agent, or Firm—Larson, Taylor and Hinds

[57] ABSTRACT

A sodium-sulphur electric cell is provided having a sulphur compartment in which a current collector of hollow form extends. The space inside the current collector is used as an expansion space for products arising from reaction of sodium and sulphur. The walls of the current collector may be tapered to arrange that the current density along it is substantially constant.

7 Claims, 3 Drawing Figures

SODIUM-SULPHUR ELECTRIC CELLS

This invention relates to sodium-sulphur electric cells and is an improvement of the cell shown in our co-pending patent application Ser. No. 556,500, now U.S. Pat. No. 3,982,959.

According to the present invention, a sodium-sulphur cell having a compartment for sulphur bounded at least in part by a solid electrolyte, and a current collecting means extending into the compartment, is characterised by a current collecting means of a hollow form, the current collecting means being adapted to contain an expansion space therewithin for products arising from reaction of sodium and sulphur and provided with port means connected between the liquid sulphur compartment and the expansion space to provide for flow of said products into and out of the space.

Preferably, the shapes of the solid electrolyte and the current collecting means are so arranged in relation to each other that they define therebetween a substantially uniform "cathode distance" that does not exceed 10 mm.

Desirably, the cross-sectional area of the current collecting means changes along the length thereof in a manner to arrange that the current density in the current collecting means is substantially constant.

The movement of the sodium ions in the liquid sulphur largely depends on diffusion, convection, and capillary effects. The diffusion movement may be derived theoretically and displayed as a graph as shown in our co-pending patent application Ser. No. 572,827. Convection and capillary effects, however, may vary with cell configuration and may have to be established empirically for a particular cell configuration A cathode distance of about 6 mm has been found satisfactory in a cell of tubular configuration.

To enable the present invention to be more readily understood, a sodium-sulphur cell incorporating the invention will now be described by way of example only and with reference to the accompanying drawings, in which.

In the above Figures, like parts have like numerals.

Figure 1:
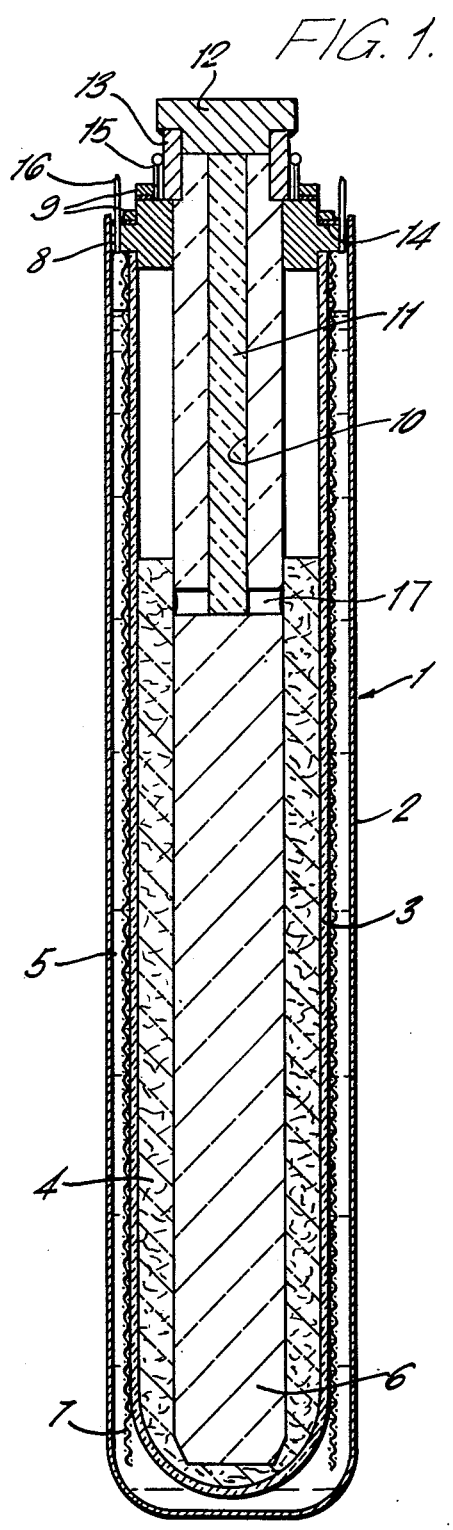
FIG. 1 shows in median section the sodium-sulphur cell shown in our co-pending patent application Ser. No. 556,500.

Referring now to FIG. 1, a sodium-sulphur battery cell comprises a metal casing 2, a solid electrolyte 3 of beta-alumina ceramic and of tubular form disposed lengthwise within the casing 2 so as to define an inner compartment 4 for sulphur and an outer, annular compartment 5 for sodium which bounds the inner compartment 4, and a circular-section carbon rod 6 disposed in the inner compartment 4 so as to serve as means for collecting current generated by electrochemical reaction between the sulphur and the sodium. For further details reference should be made to our co-pending patent application Ser. No. 556,500.

Figure 2:
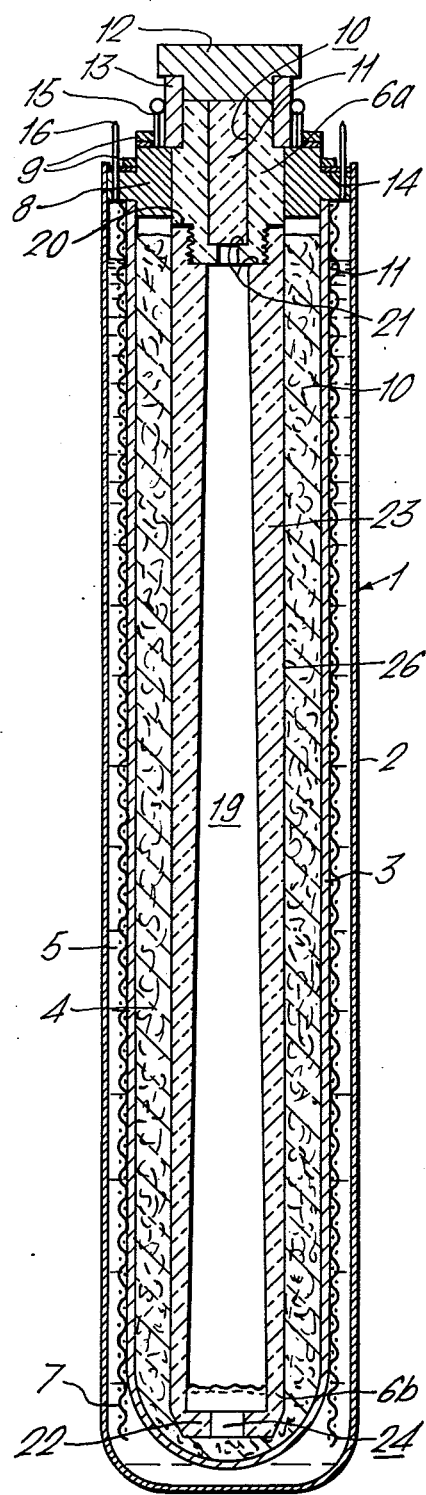
FIG. 2 shows the cell of FIG. 1 modified to incorporate the invention.

Referring to FIG. 2, the carbon rod 6 of FIG. 1 is now made in two sections, an upper end section 6a and a lower hollow section 6b having an inner space 19. The two sections 6a and 6b are joined together by an externally threaded spigot on the end section 6a which engages an internally threaded end portion of the lower section 6b and are sealed by a Grafoil seal 20.

The upper section 6a of the carbon rod 6 fits into the end cap 8 and is closed by a plug 12 in the same manner as that described in our co-pending patent application Ser. No. 556,500. The filling hole 10 in the upper section 6a now has a shoulder 21 to retain the carbon plug 11.

The wall 23 of the lower section 6b is tapered so as to arrange that in operation a substantially uniform current density exists along the lower section 6b, and defines the frusto-conical space 19. The end 22 of the lower section 6b remote from the upper section 6a is closed except for a port means in the form of an aperture 24 which permits flow between the inner compartment 4 and the space 19. The space 19 is pressurised by an inert gas, such as argon, care being taken to ensure that the cell is filled with sufficient sulphur to submerge the aperture 24 and prevent the escape of the inert gas into the inner compartment 4.

The cathode distance defined by the normal (i.e. the radial) distance between the outside surface 26 of the lower section 6b of the current collecting rod 6 and the inside surface of the solid electrolyte 3 is arranged so that it does not exceed the maximum distance that the sodium ions can travel through the liquid cathode in a specified recharge time; a distance of about 6 mm has been found satisfactory in some cases and a distance of up to 10 mm should prove satisfactory for most applications to provide a convenient recharge time.

During discharge of the cell, the formation of liquid polysulphides from the combination of the sodium and sulphur ions leads to an expansion of the liquid contained within the inner compartment 4. Expansion can now occur into the space 19 through the aperture 24, the argon gas in the space 19 being pressurised by upward flow of liquid. When the cell is charged, reverse flow of liquid takes place from the space 19 into the inner compartment 4 assisted by the pressure exerted by the pressurised argon gas and the capillary action provided by a carbon felt in the inner compartment 4.

The inner compartment 4 in sodium-sulphur cells according to the invention, may now be almost completely filled with liquid sulphur maximising the energy density of the cell whereas, as will be apparent from FIG. 1, an expansion space has previously been provided within the inner compartment 4 either above the level of the sulphur, or by only partially impregnating the carbon felt, which has reduced the quantity of sulphur contained within the cell and thereby its energy density.

The form of the invention shown in FIG. 2 is more applicable to sodium-sulphur cells in which the current collector 6 is disposed vertically, or inclined to the vertical, in the sulphur compartment.

Figure 3:
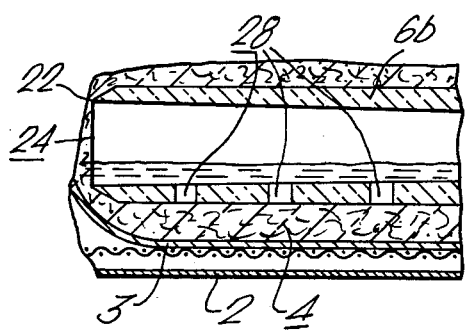
FIG. 3 shows in fragmentary median section, an alternative form of the invention.

The invention is however also applicable to sodium-sulphur cells in which the current collector 6 is disposed horizontally or inclined to the horizontal in the sulphur compartment. In such applications the aperture 24 may be enlarged, and the base of the wall 23 of the lower section 6b perforated with additional port means in the form of radial apertures 28 which extend along the current collector 6 as shown in fragmentary median section in FIG. 3 to which reference is made. Alternatively, at least one longitudinally extending slot (not shown) may be used. As the liquid sulphur and polysulphides now only have to flow circumferentially around the inner compartment 4 instead of along the length of the inner compartment 4 while the level of liquid in the space 19 falls, the use of a pressurising gas should not be necessary in view of the shorter distance involved. If the use of a pressurising gas is still thought desirable, however, the aperture 24 may be reduced and disposed eccentrically so that it is always submerged, or alternatively dispensed with altogether, the end 22 of the lower section 6b being closed.

Although the invention has been described in FIG. 2 in relation to a cell constructed in accordance with our co-pending patent application Ser. No. 556,500, its application is not confined to such cells, and may be used for example in cells having current collectors of alternative configuration, such as of flat form. A flat current collector, for example, may have a plurality of frusto-conical inner spaces 19 each with an aperture 24, or may be machined to define a single prismatic inner space.

The current collector may be made from alternative conductive non-metals, or suitable metals which will withstand the corrosive conditions in the sulphur compartment, or of composite construction such as aluminum with a graphite coating to provide a lower lengthwise electrical resistance than that of a carbon current collector having a relatively high length to diameter ratio.

Although the use of a hollow current collector having shaped walls to ensure a substantially uniform current density is preferred, this may be dispensed with. For example, a current collector having a uniform wall thickness to define an inner cylindrical space may be used, the increase in current density in the current collector towards the end cap of the cell being accepted. As an alternative, a current collector with a stepped inner space 19 may be used to introduce some equalisation of the current density along the current collector. The wall thickness of the current collector may be dimensioned so as to provide a required electrical resistance.

It will be appreciated that the invention also includes the use of a current collector with an inner space of uniform cross-section but having its outer surface shaped, for example of frusto-conical form, to provide the feature of uniform current density within the current collector. In such an event, the solid electrolyte may be shaped in a similar manner to maintain a substantially constant cathode distance between the solid electrolyte and the current collector.

Although the invention has been described in relation to the use of sodium and sulphur as the cell reactants, it is of course to be understood that this includes the use of other materials which behave in a similar manner to sodium and sulphur, and such materials are to be considered as within the scope of the claims.

We claim:

1. A sodium-sulphur electric cell having a compartment containing liquid sulphur bounded at least in part by one side of a solid electrolyte, a compartment containing liquid sodium on the other side of the solid electrolyte, and a current collecting means extending into the liquid sulphur compartment, wherein the improvement comprises a current collecting means of hollow form, the current collecting means containing an expansion space therewithin for products arising from reaction of sodium and sulphur, and port means provided in the current collecting means and connected between the liquid sulphur compartment and the expansion space to provide for flow of said products into and out of the expansion space.

2. An electric cell as claimed in claim 1, wherein the cross-sectional area of the current collecting means changes along the length thereof in a manner to arrange that in operation of the cell the current density along the current collecting means is substantially constant.

3. An electric cell as claimed in claim 1, wherein a pressurized gas is provided in the expansion space and above the level of said reaction products to assist the flow of said products from the expansion space.

4. An electric cell as claimed in claim 1, wherein the shapes of the solid electrolyte and the current collecting means are so arranged in relation to each other that they define therebetween a substantially uniform "cathode distance" that does not exceed 10 mm.

5. A sodium sulphur electric cell comprising a solid electrolyte of blind-ended tubular form bounding on the outside thereof a compartment containing liquid sodium and providing inside said solid electrolyte a compartment containing liquid sulphur impregnated in a conductive felt, a current collecting means of cylindrical shape and having a space therein, said current collecting means extending from one end lengthwise and substantially co-axially along the liquid sulphur compartment from the open end thereof, an aperture at the other end of the current collecting means connecting the space inside the current collecting means with the liquid sulphur compartment, and a pressurized inert gas contained in the space, the radial distance between the outside surface of the current collecting means and the inside surface of the solid electrolyte being arranged not to exceed 10 mm, and the space inside the current collecting means being arranged to accommodate the products arising from reaction of the liquid sulphur and liquid sodium during discharge of the cell.

6. A sodium-sulphur electric cell of tubular form and adapted for operation with its longitudinal axis horizontal, the cell comprising a solid electrolyte of blind-ended tubular form bounding on the outside thereof a compartment containing liquid sodium and providing inside said solid electrolyte a compartment containing liquid sulphur impregnated in a conductive felt, a current collecting means of cylindrical shape and having a space therein, said current collecting means extending from one end lengthwise and substantially co-axially along the liquid sulphur compartment from the open end thereof, and radially disposed apertures connecting the space with the liquid sulphur compartment and arranged to extend along the base of the curved surface of the current collecting means in operation of the cell, the radial distance between the outside of the current collecting means and the inside of the solid electrolyte being arranged not to exceed 10 mm, and the space inside the current collecting means being arranged to accommodate the products arising from reaction of the liquid sulphur and liquid sodium during discharge of the cell.

7. An electric cell as claimed in claim 6, wherein the port means comprises a plurality of radial apertures in the current collecting means.

* * * * *

UNITED STATES PATENT OFFICE
CERTIFICATE OF CORRECTION

Patent No. 4,011,367　　　　　　　　　Dated March 8, 1977

Inventor(s) Leslie Samuel Evans et al.

It is certified that error appears in the above-identified patent and that said Letters Patent are hereby corrected as shown below:

On the title page, item [73] "The Secretary for Defence" should read -- The Secretary for Industry --.

Signed and Sealed this

Twenty-fourth Day of October 1978

[SEAL]

Attest:

RUTH C. MASON
*Attesting Officer*

DONALD W. BANNER
*Commissioner of Patents and Trademarks*